3,557,198
PROCESS FOR THE PRODUCTION OF ALKALI METAL SALICYLATES
Harry Yakimik, Jr., Garfield, N.J., assignor to Tenneco Chemicals, Inc., a corporation of Delaware
No Drawing. Continuation-in-part of application Ser. No. 584,371, Oct. 5, 1966. This application Apr. 12, 1967, Ser. No. 630,211
The portion of the term of the patent subsequent to July 29, 1986, has been dedicated to the Public
Int. Cl. C07c 65/10
U.S. Cl. 260—521  7 Claims

ABSTRACT OF THE DISCLOSURE

Alkali metal salts of salicylic acid that are substantially free of colored impurities are prepared by neutralizing high quality salicylic acid with high quality alkali metal carbonate in an aqueous medium that is maintained throughout the reaction at a pH below about 8 and a temperature below about 60° C. When U.S.P. salicylic acid that has an APHA color rating of less than 25 is used in this process, the product generally has an APHA color rating of less than 20.

---

This is a continuation-in-part of my copending patent application Ser. No. 584,371, now U.S. Pat. 3,458,566, which was filed on Oct. 5, 1966.

This invention relates to an improved process for preparing alkali metal salicylates. More particularly, the invention pertains to a process for the preparation of substantially colorless sodium salicylate.

Alkali metal salts of salicylic acid and substituted salicylic acids often contain colored impurities which not only give them an undesirable color, but also render them unsatisfactory for their ultimate commercial application since the color is imparted to the finished products. This color problem is particularly serious when the alkali metal salicylic acid salt is used in the pharmaceutical industry. Similar problems arise when the alkali metal salts of salicylic acid are used as intermediates in chemical syntheses.

The removal of the colored impurities from the salicylic acid salts by means of distillation, extraction, or other conventional purification procedures is not economically attractive due to the expense involved and to the necessary loss of some of the salicylic acid salt. Various stabilizing and chelating agents have also been employed to inhibit color formation or to mask the colorants in the alkali metal salts of salicylic acid or products made therefrom. The use of such special materials has numerous drawbacks, such as incompatibility with the end use of the salicylic acid salts, and it often does not have a permanent effect as, for example, when the salicylic acid salts or products made therefrom are stored prior to commercial use or consumption. It would therefore be desirable to have a process available whereby high quality salicylic acid salts could be readily produced on a commercial scale without requiring the use of special purification procedures or the addition of special agents to the salt products.

It is an object of this invention to provide an improved process for the preparation of high quality alkali metal salts of salicylic acid and substituted salicylic acids.

Another object of this invention is to provide an improved process for the preparation of substantially colorless sodium salicylate.

A further object of this invention is to prepare high quality alkali metal salicylates from salicylic acid or substituted salicylic acids while avoiding the formation of undesirable colorants.

A still further object of this invention is to provide an improved process for the direct neutralization of salicylic acid to produce alkali metal salts that are substantially free of undesirable coloration.

Other objects of the present invention will become readily apparent from the ensuing description and the illustrative embodiments.

It is well known that alkali metal salicylates can be prepared by reacting salicylic acid or a substituted salicylic acid with an alkali metal carbonate. When high grade alkali metal salicylates are desired, it is customary to react a purified salicylic acid with a high purity alkali metal carbonate in an aqueous medium and to purify the resulting salt by distillation, by extraction, or by another conventional procedure.

In accordance with this invention, it has been found that alkali metal salicylates that are substantially free of colored impurities can be obtained directly by carrying out the neutralization of salicylic acid with an alkali metal carbonate under special and critical conditions. When the neutralization is carried out in accordance with the processes of this invention, a substantially pure, colorless product is obtained which can be used for most purposes without further purification.

In order to obtain the desired colorless alkali metal salicylates, it is necessary that starting materials be low in color and contain little or no iron and that the reaction be carried out under conditions that inhibit or prevent the formation of alkali metal bicarbonates and of color bodies.

The quality of the product is dependent to a large degree upon the purity of the reactants. A purified grade of salicylic acid must be used. The salicylic acid is preferably a sublimed material that meets the U.S.P. requirements. Particularly satisfactory results have been obtained using U.S.P. sublimed salicylic acid that contains less than about 0.5 p.p.m. of iron and has an APHA color rating (10/50) of less than about 25, and preferably in the range of 4 to 10. While salicylic acid is usually used as the starting material in the processes of this invention, it is to be understood that such substituted salicylic acids as p-aminosalicylic acid, 5-tertiarybutyl-salicylic acid, 3-methyl-5-isopropylsalicylic acid, 3-methyl-4-isopropylsalicylic acid, 4-hexyl-salicylic acid, 5-phenylsalicylic acid, and the like, and mixtures thereof may also be used in this reaction.

The alkali metal carbonate should also be of high quality. It is generally preferred to use sodium carbonate monohydrate or potassium carbonate monohydrate that contains less than about 15 p.p.m. of iron.

Since ordinary tap water usually contains iron and other metallic impurities in relatively high concentrations which, as is well known in this art, will impart undesirable pink or brown color to the alkali metal salicylate products, it is generally preferred to use distilled water as the reaction medium. At times, depending upon the source of the water, it is also desirable to subject the distilled water to an ion exchange treatment to ensure that harmful impurities are reduced below contamination levels.

In the practice of this invention, high quality salicylic acid is neutralized with a high quality alkali metal carbonate in an aqueous medium that is maintained throughout the neutralization reaction at a pH below about 8 and a temperature below about 60° C. The reactants are combined rapidly, and the reaction mixture is agitated vigorously to facilitate the removal of by-product carbon dioxide. The resulting aqueous alkali metal salicylate solution may then be dried to yield a substantially pure and colorless product.

Each of the aforementioned reaction conditions must be met if the desired colorless product is to be obtained. If the pH of the reaction mixture is allowed to rise above about 8 or the temperature to rise above about 60° C. during the reaction, colored impurities are formed and a colored product results.

In order to obtain substantially colorless alkali metal salicylates, it is necessary that the temperature be maintained below about 60° C. since the use of higher temperatures leads to the formation of colored impurities. The preferred reaction temperature is in the range of 5° C. to 50° C. The processes of this invention are generally carried out under atmospheric pressure since the pressure employed is not critical.

As has been indicated, control of the pH of the reaction mixture during the neutralization reaction is necessary if a substantially colorless product is to be obtained. Unless the pH of the reaction mixture is maintained below about 8, and preferably in the 5 to 7.5 range, from the time that the reaction begins as is evidenced by the foaming of the reaction mixture until the reaction has been completed, a colored product will be formed. If the pH is allowed to rise above 8 during the course of the reaction, the reaction usually stops, and colored impurities are formed. When this occurs, it is necessary to heat the reaction mixture to about 70–75° to restart the reaction. This heating results in the further coloration of the product.

The method by which the reactants are combined is not critical provided that the temperature and the pH of the reaction mixture remain in the aforementioned specified ranges.

In one embodiment of the invention, salicylic acid is added to an aqueous solution containing about 18% to 30% by weight of an alkali metal carbonate at such a rate that the temperature of the reaction mixture does not exceed about 60° C. and its pH does not exceed about 8. Alternatively, the salicylic acid and alkali metal carbonate are added simultaneously or stoichiometrically equivalent portions of these materials are added alternately to an aqueous medium at such rates that the temperature and pH of the reaction mixture remain in the specified ranges. The reactants are added rapidly, and the reaction mixture is agitated vigorously to permit the by-product carbon dioxide to escape as quickly as possible from the reaction mixture. The time of addition may vary within a wide range; the addition of the reactants is usually completed in about 5 minutes to 15 minutes. In most case, stoichiometrically equivalent amounts of the salicylic acid and alkali metal carbonate are used. A small excess of either reactant may be present provided it does not cause the pH of the reaction mixture to leave the specified range. The amount of water used is generally that which will result in the formation of a reaction mixture that contains about 20% to 45% by weight, and preferably 35% to 45% by weight, of the alkali metal salicylate. Larger or smaller amounts of water may be used if desired.

Conventional procedures may be employed to recover the alkali metal salicylate from the water. Thus, for example, the aforedisclosed aqueous reaction product mixture may be heated under vacuum to effect dehydration. Other drying equipment which may be employed includes spray dryers, rotary vacuum dryers, drum dryers, and thin-film evaporators. It will be understood, however, that the exact manner of recovering the high quality alkali metal salicylate is not an important aspect of this invention.

When the production of alkali metal salicylates is accomplished by means of the processes described herein, a substantially pure product having an APHA color rating of less than about 20 is obtained. The reasons why these processes yield colorless products, whereas the previously known processes yield discolored products are not now fully understood. It is believed, however, that when the reaction is carried out under the conditions herein specified, the formation of alkali metal bicarbonation and certain color bodies is minimized. It has been shown experimentally that the addition of sodium bicarbonate to the reaction mixture inhibits the reaction of salicylic acid with sodium carbonate and causes the formation of colored reaction by-products. When the reaction has stopped as the result of the presence of sodium bicarbonate in the reaction mixture, it is necessary to heat the reaction mixture to 70° C. or higher to restart it. Since this heating results in the formation of additional colored reaction by-products, the reaction should be carried out so as to prevent the formation of alkali metal bicarbonate and the resulting color formation and interference with the salt-forming reaction.

The invention is further illustrated by the examples that follow. Although these examples are directed to the preparation of sodium salicylate, which is of prime commercial importance, other alkali metal salicylates may also be readily prepared by the practice of this invention. In the examples, all parts and percentages are parts by weight and percentages by weight unless otherwise specified.

EXAMPLE 1

Three hundred parts of distilled water was charged to reaction vessel that was equipped with an agitator, a thermometer, and a pH probe. After the addition to the water of 90 parts of sodium carbonate monohydrate, 200 parts of U.S.P. sublimed salicylic acid (APHA color rating—6) was added over a period of 5 minutes during which time the reaction mixture foamed vigorously. The salicylic acid was added at such a rate that the pH of the reaction mixture did not exceed 7 and the foaming caused by the evolution of carbon dioxide neither ceased nor became excessive. During the reaction, the temperature of the reaction mixture was maintained in the range of 10° C. to 30° C. and the pH in the range of 5.5 to 6.3. When the salicylic acid addition had been completed, the temperature of the reaction mixture was 10° C. and its pH was 5.5. The agitation was continued for about 30 minutes during which time the temperature of the solution rose to 25° C. and its pH to 5.85. The clear solution, which contained 0.23% of free salicylic acid and 44.1% of sodium salicylate and which has a specific gravity at 25° C. of 1.185, had an APHA rating (5/50 at sp. gr. 1.050 at 25° C.) of 10 clear.

Four hundred parts of this solution was dried under vacuum to produce 163.4 parts of colorless sodium salicylate having the following properties:

Water content—0.03%
Free salicylic acid content—0.14%
APHA Rating [1]—11 clear
THT Color Rating [2]—110

EXAMPLE 2

To 3000 parts of distilled water in a reaction vessel was added 300 parts of U.S.P. salicylic acid (APHA color rating—10) and then 100 parts of sodium carbonate monohydrate. Reaction began at once as was evidenced by the foaming of the reaction mixture. When the bulk of the foam had dissipated, another 300 parts of U.S.P salicylic acid and then another 100 parts of sodium carbonate monohydrate were added to the reaction mixture. This procedure was repeated until all of the sali-

---

[1] The APHA color is determined by a test procedure set forth by the American Public Health Association and reported in "Standard Methods for the Examination of Water and Sewage," 9th edition, 1946, pages 14 and 15.
[2] A test developed to determine the color of the sodium salicylate under basic conditions. The test comprises dissolving 10 grams of the sodium salicylate product in 10 ml. of distilled water followed by the addition of 0.2 ml. of 10% sodium carbonate solution. The color is read on the APHA scale after mixing well and waiting 3 minutes. Ratings above about 200 indicate that undesirable coloration will develop when the sodium salicylate is used under conditions where the pH exceeds 7.

cylic acid and all of the sodium carbonate had been added. Throughout the addition of the reactants, the temperature of the reaction mixture was maintained at 50° C. and the pH did not rise above 7.0. The clear solution obtained had an APHA color (10/50) of 3–4 clear.

The solution was evaporated to dryness under vacuum to produce colorless sodium salicylate that had an APHA color of 8 clear and a THT rating of 75.

COMPARATIVE EXAMPLE A

To 400 parts of distilled water in a reaction vessel was added 300 parts of U.S.P. sublimed salicylic acid. To this slurry was added 500 ml. of a 20% sodium carbonate solution over a period of 70 minutes during which time the temperature of the reaction mixture was in the range of 61° C. to 67° C. The resulting yellow solution was evaporated to dryness under vacuum to yield sodium salicylate that was yellow in color and that had an APHA color rating of 150 cloudy.

COMPARATIVE EXAMPLE B

A slurry of 300 parts of U.S.P. sublimed salicylic acid in 500 grams of distilled deionized water was heated with agitation to 59° C. A total of 510 parts of a 20% sodium carbonate solution was added to the slurry over a period of 56 minutes during which the temperature was in the range of 66° to 76° C. and the pH in the range of 2.5 to 4.7. The resulting yellow solution was evaporated to dryness under vacuum to yield sodium salicylate that was yellow in color and that had an APHA rating of 40 cloudy.

COMPARATIVE EXAMPLE C

The procedure described in Example 1 was repeated except that the salicylic acid was added at such a rate that the pH of the reaction mixture rose above 8. The neutralization reaction stopped before all of the salicylic acid had been added, as was evidenced by the absence of foaming. At this point the reaction mixture had become yellow. The reaction was restarted by heating the reaction mixture to 70° C. Yellow sodium salicylate was recovered from the reaction mixture.

The data in the examples show that a high quality sodium salicylate product can be obtained only when the pH of the reaction mixture is maintained below about 8 and the reaction temperature below about 60° C. When these conditions are met, as in Examples 1 and 2, colorless salicylate salts are obtained that have APHA color ratings of about 5 to 20 and THT ratings of about 50 to 125, whereas when the temperature is allowed to rise above 60° C. as in Comparative Examples A and B, or the pH is allowed to exceed 8 as in Comparative Example C, a yellow sodium salicylate product is obtained.

The terms and expressions which have been employed are used as terms of description and not of limitation. There is no intention in the use of such terms and expressions of excluding any equivalents of the features shown and described or portions thereof; it is to be recognized that various modifications are possible within the scope of the invention claimed.

What is claimed is:

1. A process for the preparation of substantially colorless alkali metal salicylates which comprises adding high quality salicylic acid and high quality alkali metal carbonate simultaneously to an aqueous reaction medium at such rates that the pH of the reaction mixture does not exeed about 8 and the temperature of the reaction mixture does not exceed about 60° C. and thereafter recovering alkali metal salicylate from the reaction mixture.

2. The process of claim 1 wherein the salicylic acid used is sublimed U.S.P. salicylic acid having an APHA color rating (10/50) in the range of 4 to 10 and the water used in forming the aqueous reaction medium is distilled water.

3. The process of claim 1 wherein the pH is maintained in the range of 5 to 7.5 and the temperature is maintained in the range of 5° C. to 50° C. throughout the neutralization reaction.

4. The process of claim 1 wherein the reaction mixture is agitated vigorously throughout the neutralization reaction.

5. A process for the preparation of substantially colorless sodium salicylate which comprises adding stoichiometrically equivalent portions of salicylic acid having an APHA color rating (10/50) of less than 25 and sodium carbonate monohydrate alternately to an aqueous reaction medium at such rates that the pH of the reaction mixture does not exceed about 8 and the temperature of the reaction mixture does not exceed about 60° C.

6. The process of claim 5 wherein the salicylic acid used is sublimed U.S.P. salicylic acid having an APHA color rating (10/50) in the range of 4 to 10 and the water used in forming the aqueous reaction medium is distilled water.

7. The process of claim 5 wherein the pH is maintained in the range of 5 to 7.5 and the temperature is maintained in the range of 5° C. to 50° C. during the course of the reaction.

No references cited.

LORRAINE A. WEINBERGER, Primary Examiner

E. J. GLEIMAN, Assistant Examiner